(12) United States Patent
Britton

(10) Patent No.: US 7,425,946 B1
(45) Date of Patent: Sep. 16, 2008

(54) REMOTE CAMOUFLAGE KEYPAD FOR ALARM CONTROL PANEL

(76) Inventor: Rick A. Britton, 4009 W. 150th St., Leawood, KS (US) 66224

( * ) Notice: Subject to any disclaimer, the term of this patent is extended or adjusted under 35 U.S.C. 154(b) by 888 days.

(21) Appl. No.: 10/919,026

(22) Filed: Aug. 16, 2004

Related U.S. Application Data

(60) Provisional application No. 60/495,281, filed on Aug. 15, 2003.

(51) Int. Cl.
*G09G 5/00* (2006.01)

(52) U.S. Cl. ........................ 345/168; 345/156
(58) Field of Classification Search .............. 345/168, 345/87–89, 173–179, 103, 104, 7–9, 629, 345/156; 340/540, 514, 506, 541, 539.2, 340/573.1, 507; 313/504; 257/E33.056, 257/E51.043
See application file for complete search history.

(56) References Cited

U.S. PATENT DOCUMENTS

| | | | | |
|---|---|---|---|---|
| 4,283,717 A * | 8/1981 | Caldwell et al. | ............ | 340/506 |
| 5,213,333 A * | 5/1993 | Petrovich et al. | ............ | 273/243 |
| 5,745,849 A * | 4/1998 | Britton | .................... | 455/404.1 |
| 6,040,770 A * | 3/2000 | Britton | .................. | 340/539.24 |
| 6,140,987 A | 10/2000 | Stein et al. | .................... | 345/87 |
| 6,255,945 B1 * | 7/2001 | Britton | .................. | 340/539.24 |
| 6,292,181 B1 * | 9/2001 | Banerjee et al. | ............. | 345/179 |
| 6,548,956 B2 * | 4/2003 | Forrest et al. | ............... | 313/504 |
| 6,570,496 B2 * | 5/2003 | Britton | ........................ | 340/506 |
| 6,592,043 B1 * | 7/2003 | Britton | ........................ | 235/492 |
| 6,650,238 B1 * | 11/2003 | Britton | .................... | 340/539.1 |
| 6,975,223 B1 * | 12/2005 | Mladen et al. | ......... | 340/539.14 |
| 7,032,211 B1 * | 4/2006 | Janzig et al. | ................. | 717/120 |
| 7,239,236 B1 * | 7/2007 | Britton | ....................... | 340/514 |
| 7,324,166 B1 * | 1/2008 | Joslin et al. | .................. | 348/722 |
| 2001/0000005 A1 * | 3/2001 | Forrest et al. | .......... | 204/192.12 |
| 2002/0008693 A1 * | 1/2002 | Banerjee et al. | ............. | 345/182 |
| 2002/0085843 A1 * | 7/2002 | Mann | ......................... | 396/374 |
| 2002/0153243 A1 * | 10/2002 | Forrest et al. | .......... | 204/192.26 |
| 2003/0142068 A1 * | 7/2003 | DeLuca et al. | .............. | 345/156 |
| 2003/0213967 A1 * | 11/2003 | Forrest et al. | ................. | 257/96 |
| 2006/0238503 A1 * | 10/2006 | Smith et al. | .................. | 345/156 |

* cited by examiner

*Primary Examiner*—Prabodh Dharia
(74) *Attorney, Agent, or Firm*—Jonathan A. Bay

(57) ABSTRACT

A glass keypad for an automatic premise-monitoring alarm system of remote sensors linked to a control panel has a screen defined by a peripheral edge spacing inboard and outboard faces and allowing a flush or closely gapped mounting to a wall. There is also operative circuitry and devices as well as a diminutive housing that conceals the circuitry and devices and is mounted to the peripheral edge and/or outboard face. Thus, the glass keypad has display mode, where a display is illuminated on the screen including illuminated keys for entry of inputs to the control panel, as well as a sleep mode in which the illumination is switched to reduced power such that the keypad display is invisible. The reduced power state is off or very low such that any color, texture or design on the wall shows through, the glass keypad thus self-camouflaging itself.

20 Claims, 12 Drawing Sheets

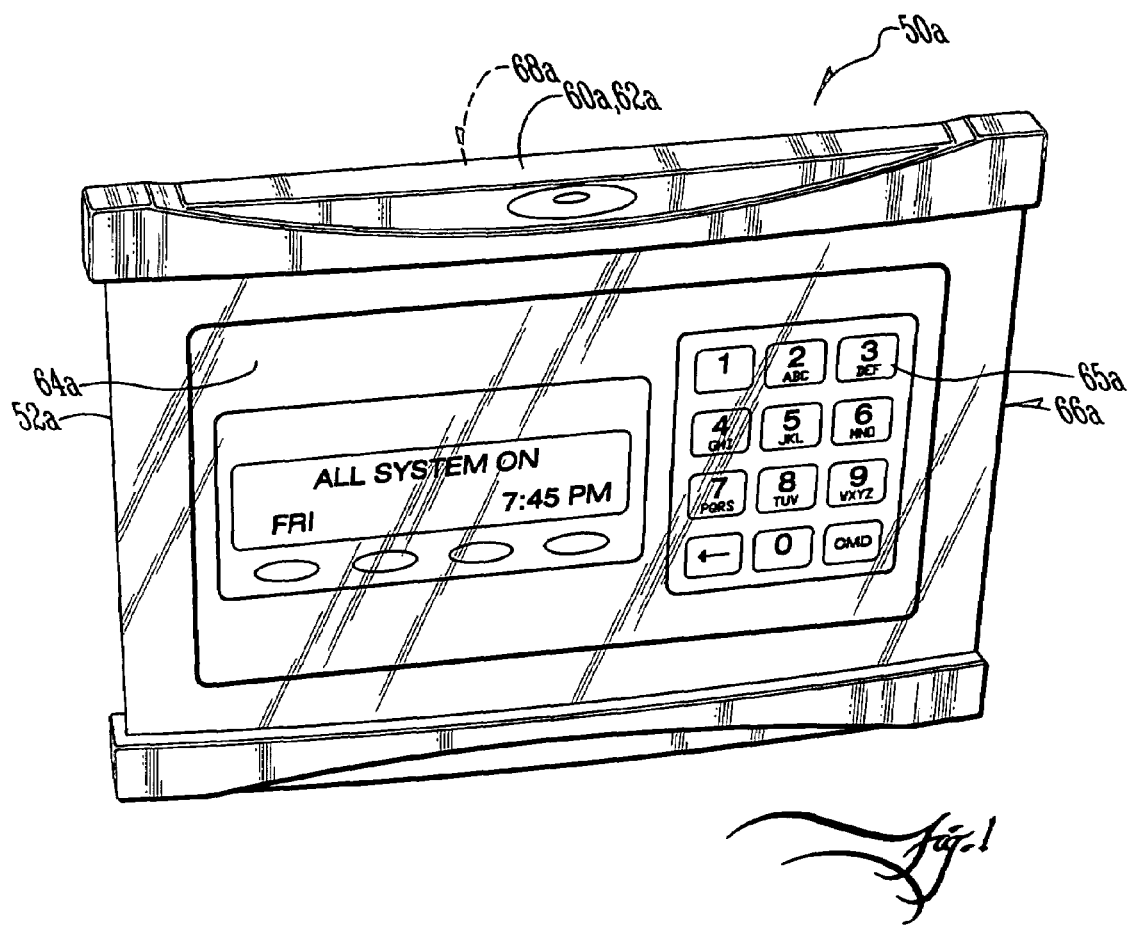

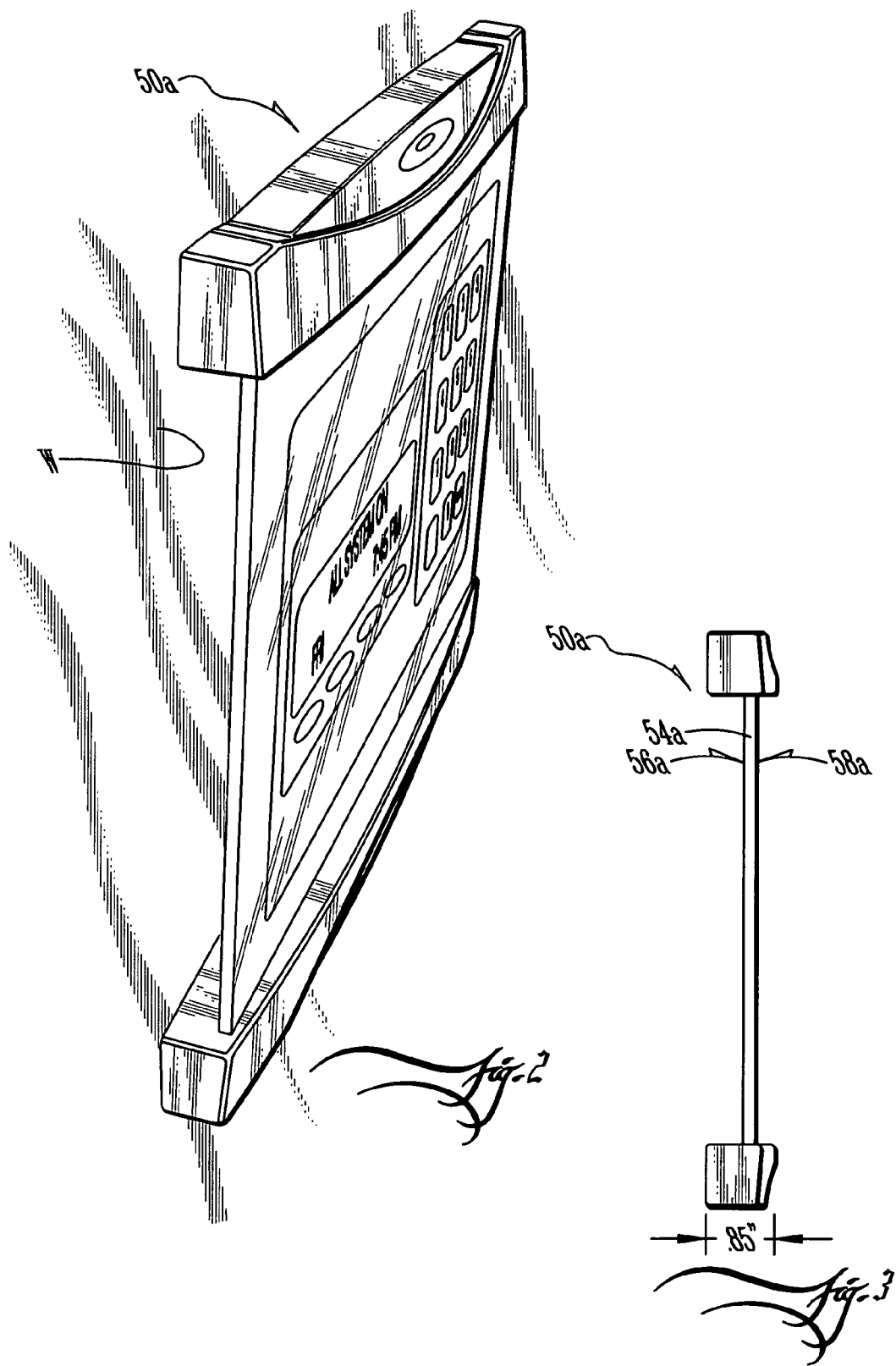

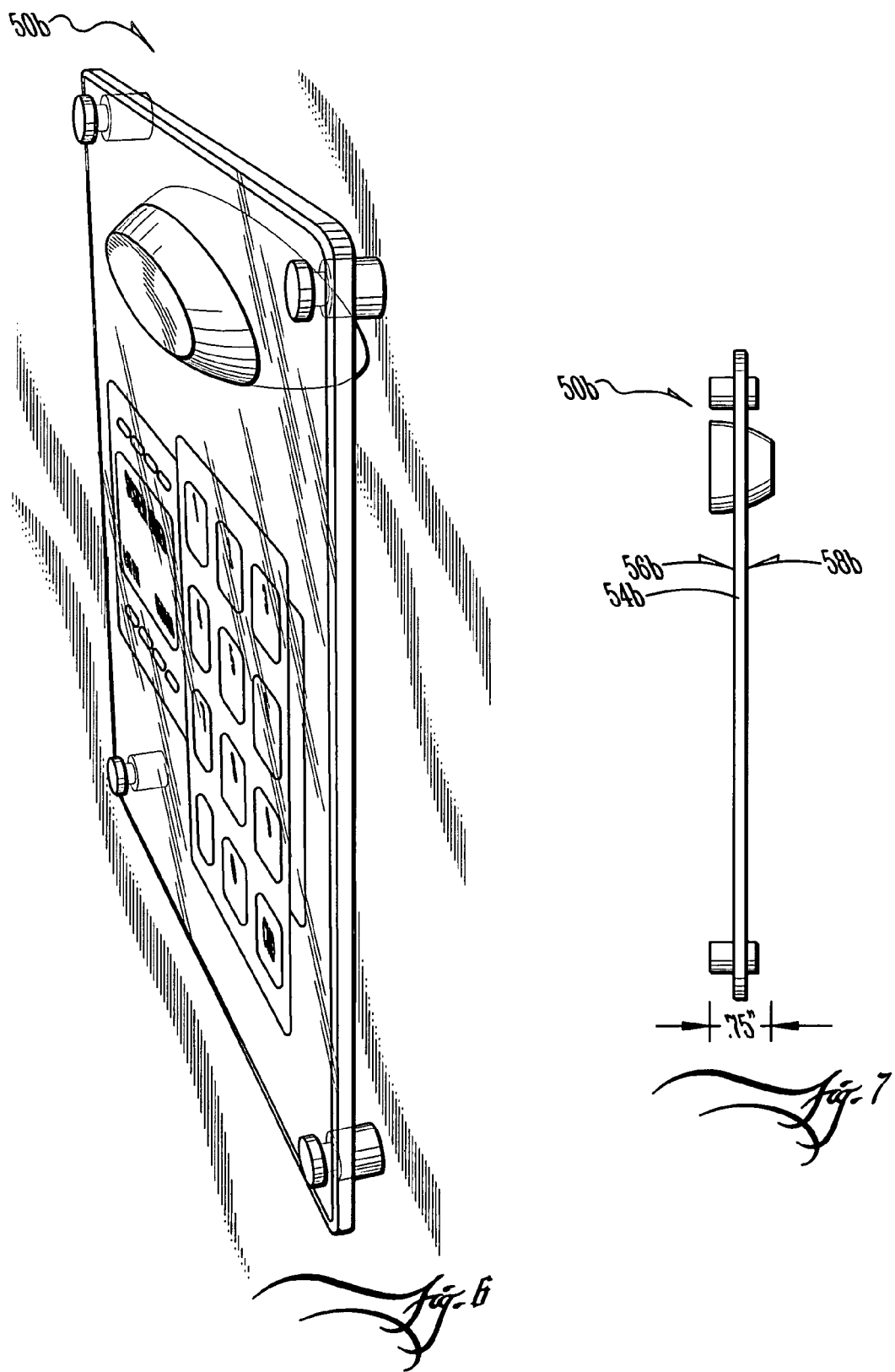

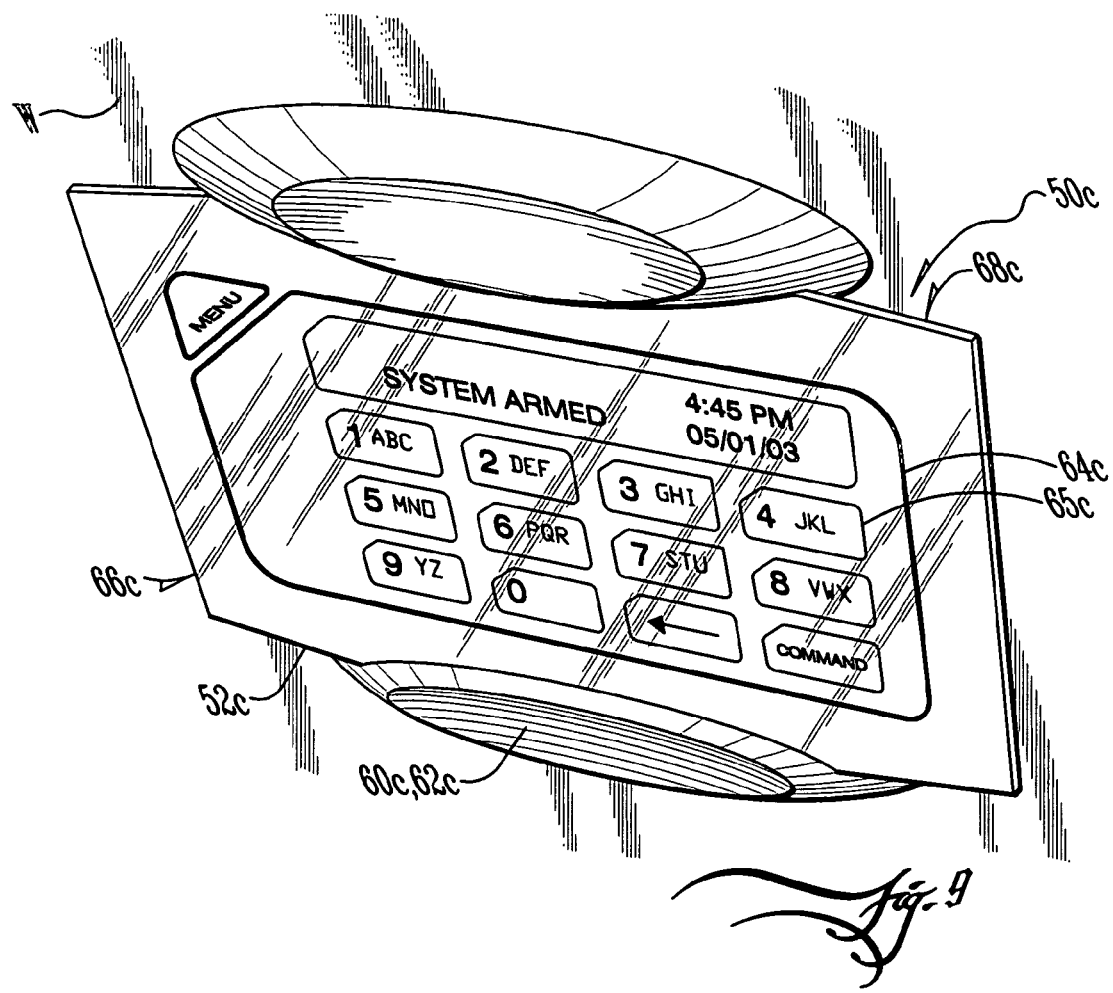

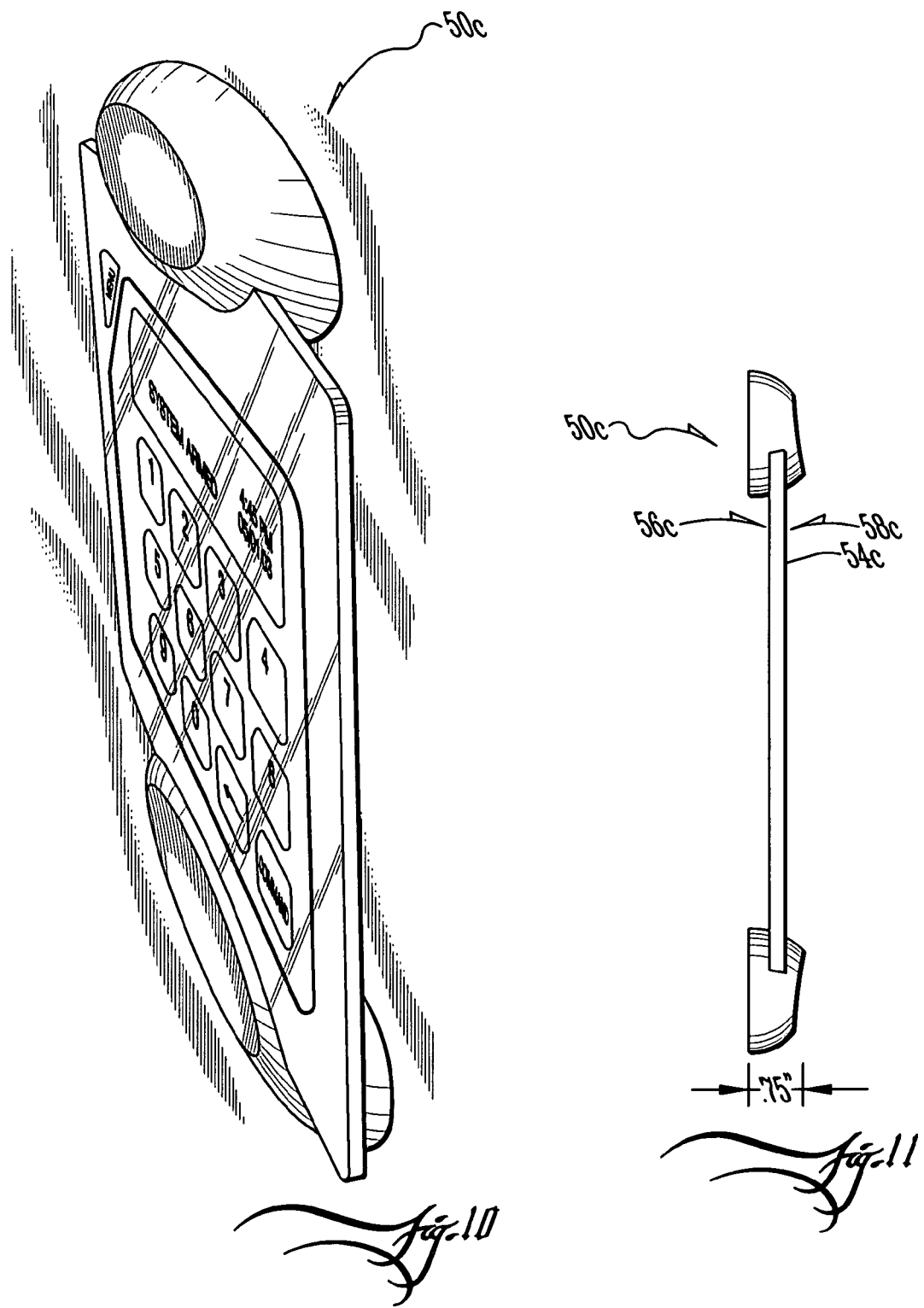

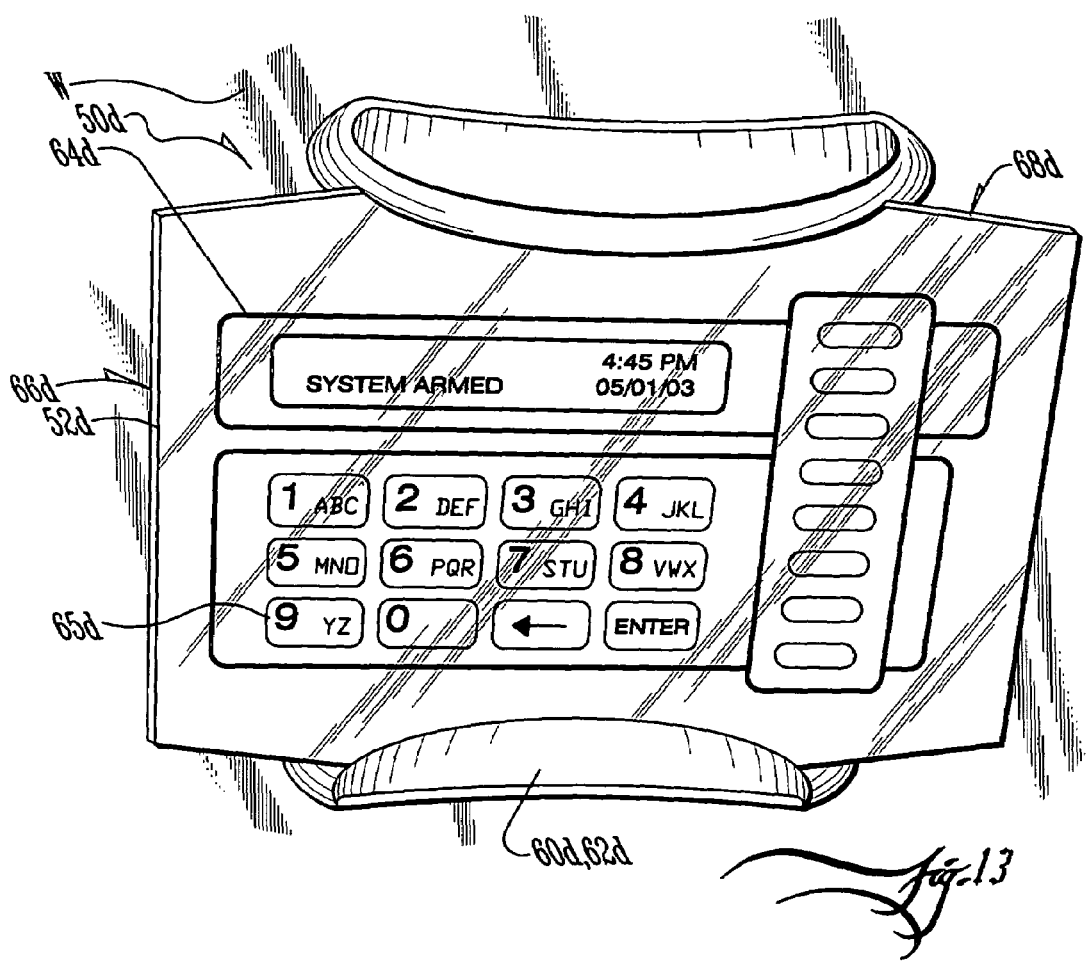

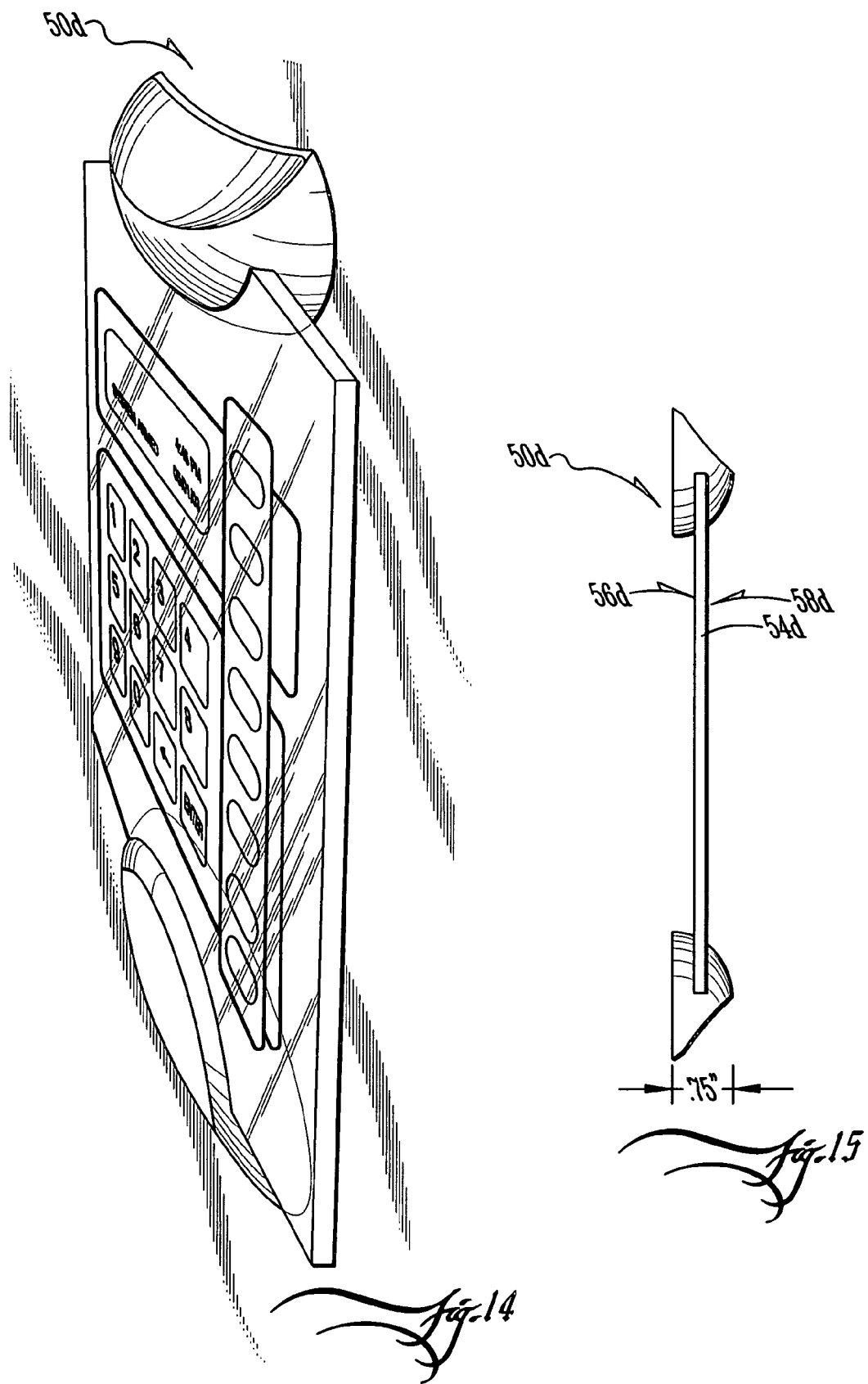

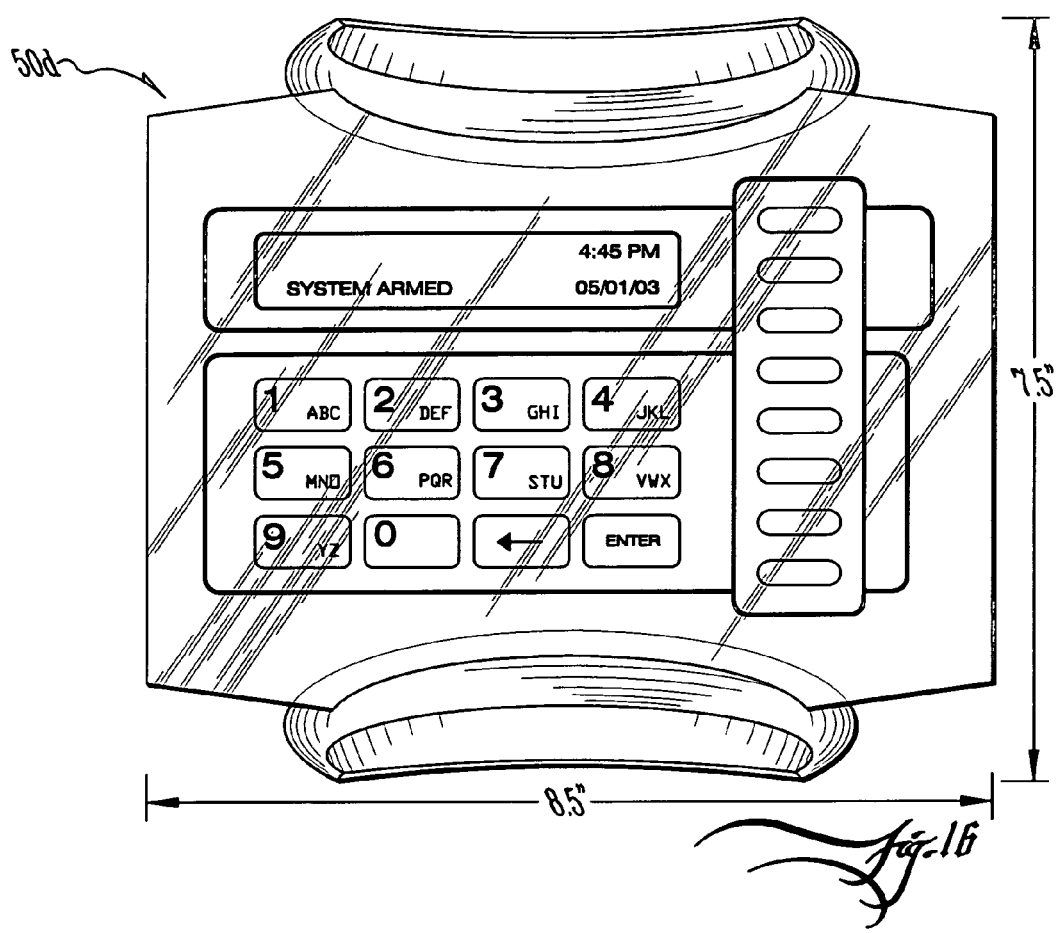

REMOTE CAMOUFLAGE KEYPAD FOR ALARM CONTROL PANEL

CROSS-REFERENCE TO PROVISIONAL APPLICATION(S)

This application claims the benefit of U.S. Provisional Application No. 60/495,281, filed Aug. 15, 2003.

BACKGROUND AND SUMMARY OF THE INVENTION

The invention relates to automatic, premise-monitoring alarm systems as for example burglary, otherwise unauthorized access and/or fire alarm systems, and more particularly to a remote camouflage keypad for user input to the local premise's alarm control panel, as will be apparent in connection with the discussion further below of preferred embodiments and examples.

Premise-monitoring alarm systems monitor a given protected premise—say, for example, a residential home, a commercial property, a bank vault, access through a given door or throughway, or an ATM machine and the like—for the occurrence of a given alarm event:—e.g., an unwanted intrusion, unauthorized entry or smoke and so on. Some alarm events simply correspond to a "low battery" condition in either the alarm-event sensors or else the protected-premise controller/control panel. Upon detection of a given alarm event, the controller signals the alarm event to a pre-determined receiving site(s), which traditionally has been a central alarm-monitoring station. In the traditional case, the central alarm-monitoring station, which may be a public or private service, may manually process the signal by an attendant who can dispatch police or fire-fighters or alert the property-owners or take whatever other steps are appropriate.

More particularly the invention relates to an improvement over the conventional peripheral device which has served as the keypad for the local premise's local control panel.

A distinction is made here for clarification's sake between control panel and keypad. A control panel might be more aptly described as a cabinet. However, in the industry it is called "control panel," perhaps because in earlier years all the necessary circuitry and devices could be contained in something the size more readily describable as a "panel." Nowadays, however, such circuitry and devices are contained in a rather bulky cabinet, which is typically hidden out of sight in a closet or the like.

Keypad is the peripheral that is (i) often separate and remote from the control panel and (ii) provides ordinary users with an interface for an abbreviated set of inputs and outputs with the control panel. Physical access to the actual control panel is best reserved for professional installers and service personnel only.

Put differently, typically the control panel circuitry is contained in a moderately bulky housing which is preferably hid out of sight in some closet or secure interior room. Indeed access to the control panel is a matter best reserved for professional installers or service providers thereto, and not the actual end-use customers of such local premise-monitoring alarm system. Instead, the actual end-use customers (or let's say a relatively small set of authorized employees or parties thereof) are relatively limited as to what control instructions they can enter to their local premise-monitoring alarm control panel, and inter alia physically by way of a keypad.

Conventionally, keypads have been mounted next to doors that are protected, or elsewhere which is as close as possible to afford a pedestrian authorized party convenient walk-up access to enter codes or the like to disable within a given grace time an alarm event. To date such keypads are very visible. Even if the codes to disabling delayed-alarm events within the grace period are generally held secrets among a small set of authorized parties, the problem is that such keypads' key arrangement is permanently visible to non-authorized parties. Hence, a non-authorized observer observing an authorized user entering a code from afar might be able to discern the authorized party's finger stroke and hence stealthily deduce the code. For instance, a code of "6985" on a standard keypad is accomplished through a simple square of keystrokes on a standard keypad. Such a code is easily discerned from a far back vantage point.

It is an object of the invention to provide a nearly invisible keypad in the form of a glass keypad which, after a brief period of non-use, lapses into a sleep mode.

It is another object of the invention that such a nearly invisible—or disguised or concealed—keypad is only awaken from sleep mode by a knowledgeable touch the information about which is only given to an authorized set of users.

It is an alternate object of the invention that when the invisible—or otherwise disguised or concealed—keypad is awoken from sleep mode that it provides numeral and/or alphabetic keys in a randomly scrambled pattern such that one pattern from the next differs. That way, a distant observer observing a geometric pattern of finger strokes cannot simply deduce the code from common knowledge of a conventional keypad arrangement.

It is an additional object of the invention that the invisible—or otherwise disguised or concealed—keypad in accordance with the invention lapses into sleep mode in a nearly transparent or translucent state such that is "chameleon" with its background. In other words, if the invisible keypad goes transparent, all that is practically visible is the wallpaper of the supporting wall which carries the keypad. Hence there is no evident way to the uninformed on any such matters as (i) what is the function of such transparent/translucent piece of glass, (ii) how to awaken it into operative mode, and/or (iii) what to anticipate in operative mode if one successfully stumbles into awakening it into operative mode.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of one embodiment of a remote camouflage keypad for alarm control panel in accordance with the invention, wherein a glass panel is bracketed between upper and lower brackets at least one of which contains operative circuitry for driving the panel as well as preferably local power storage (eg., battery(ies)) as well as communication link(s) (eg., radio transmitter(s)) for communicating with a remote control panel;

FIG. 2 is a comparable perspective view except from a relatively more acute angle;

FIG. 3 is a reduced scale side elevational view thereof; and

FIG. 6 is a comparable perspective view except from a relatively more acute angle;

FIG. 7 is a reduced scale side elevational view thereof; and

Optionally when the keypad is in sleep mode it will cooly illuminate in a soft indigo blue color. When the user properly activates the screen, the color might slowly graduate from indigo, to violet, to red. Alternatively, the screen might illuminate from a half-tone indigo color to intensify to a full indigo color.

FIG. 9 is a perspective view of another embodiment of a remote camouflage keypad for alarm control panel in accordance with the invention, wherein a glass panel is bracketed between upper and lower brackets at least one of which contains operative circuitry for driving the panel as well as preferably local power storage (eg., battery(ies)) as well as communication link(s) (eg., radio transmitter(s)) for communicating with a remote control panel;

FIG. 10 is a comparable perspective view except from a relatively more acute angle;

FIG. 11 is a reduced scale side elevational view thereof; and

Figure 4:
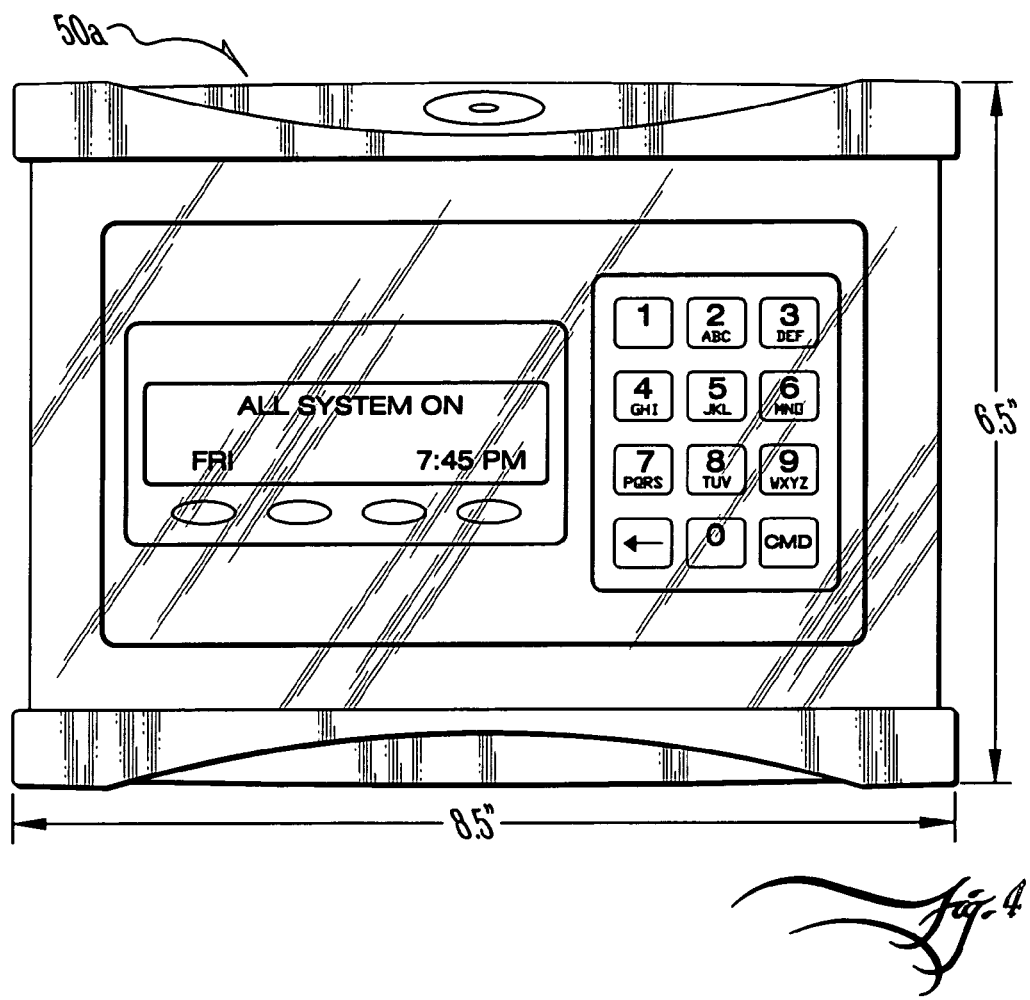
FIG. 4 is a front elevational view of FIG. 3.
Figure 5:
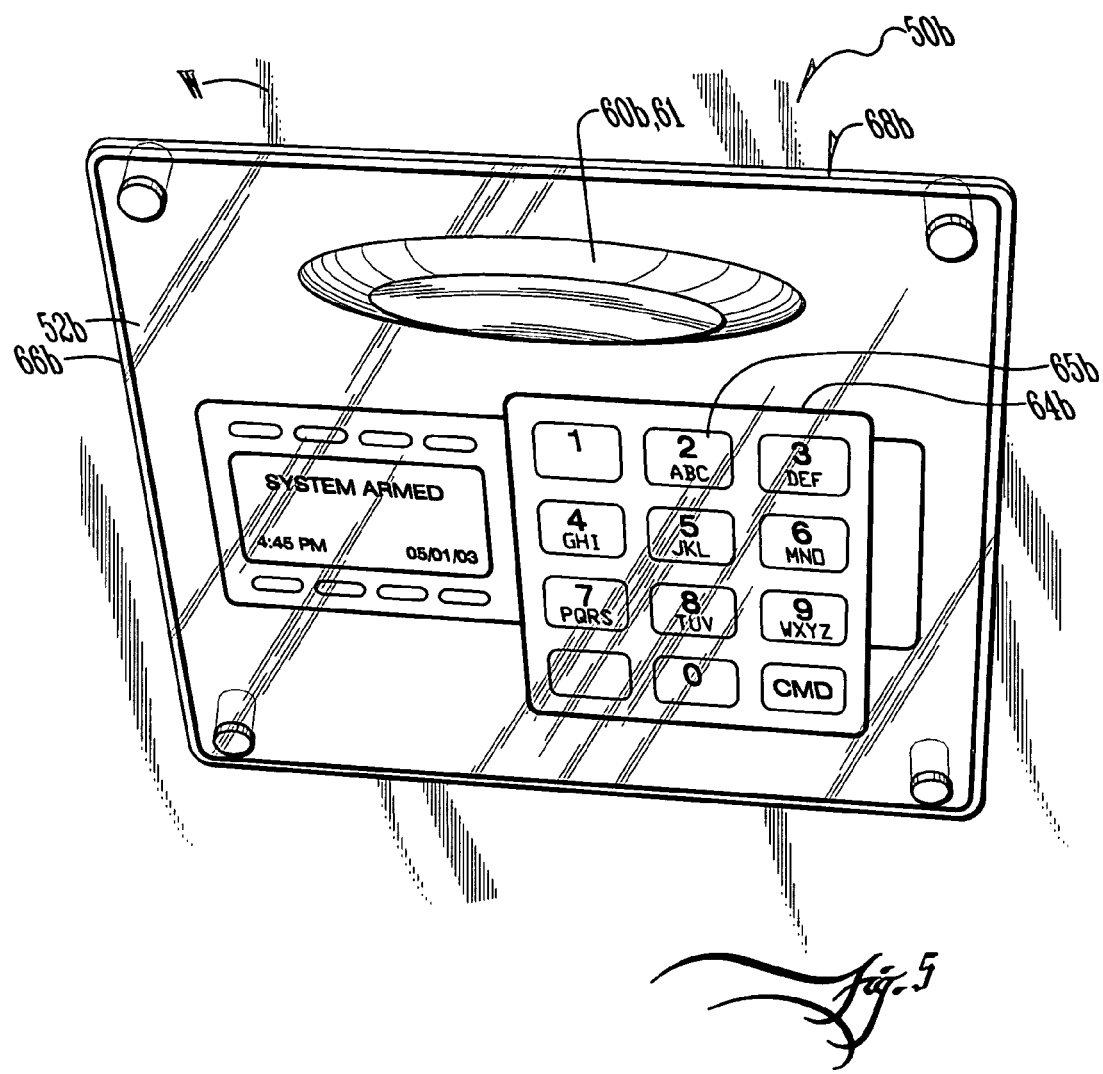
FIG. 5 is a perspective view of an alternate embodiment of a remote camouflage keypad for alarm control panel in accordance with the invention, wherein a glass panel is supported by four mounting fixtures and includes a module for containing circuitry for driving the panel as well as preferably local power storage (eg., battery(ies)) as well as communication link(s) (eg., radio transmitter(s)) for communicating with a remote control panel.
Figure 8:
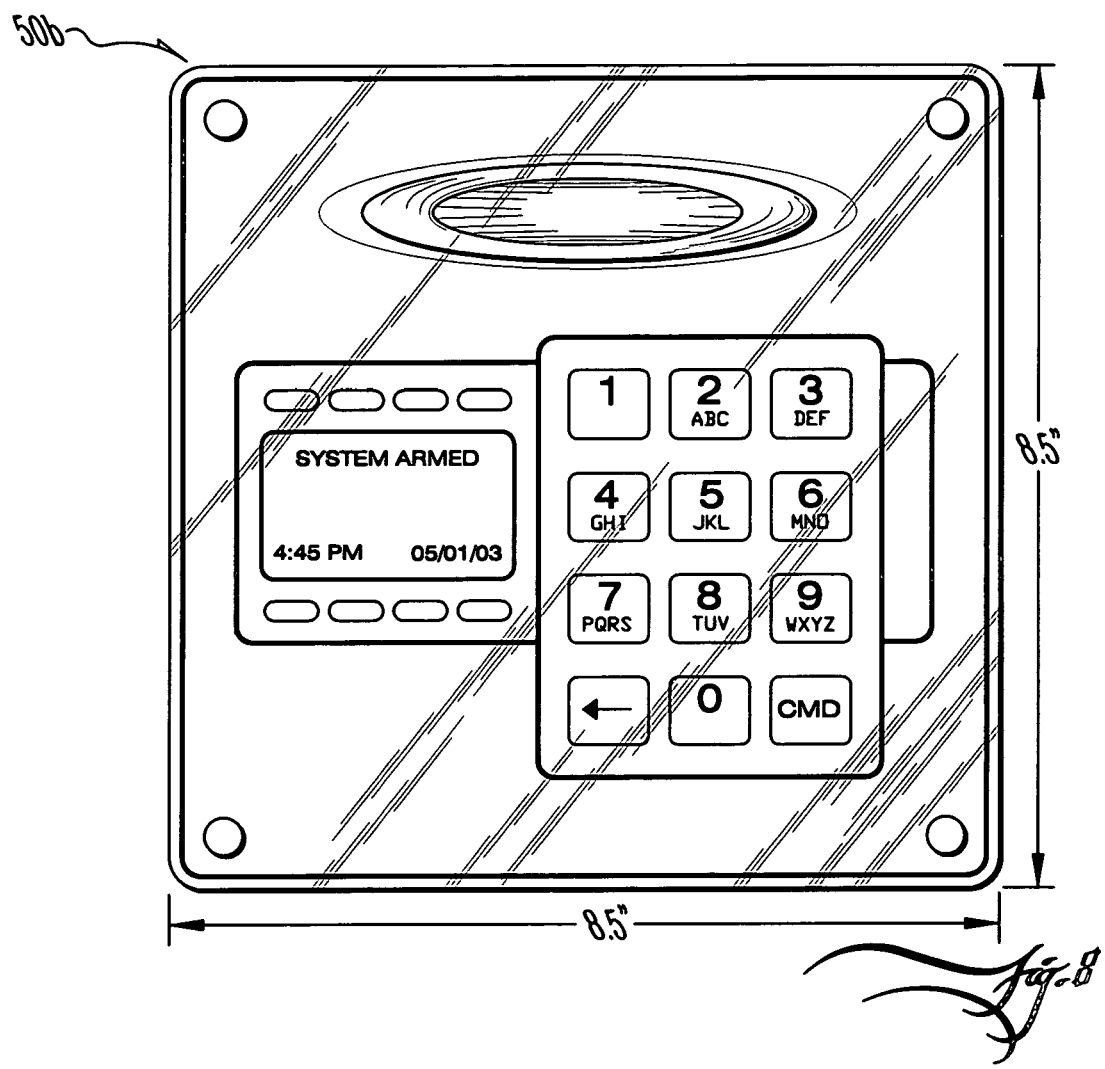
FIG. 8 is a front elevational view of FIG. 7.
Figure 12:
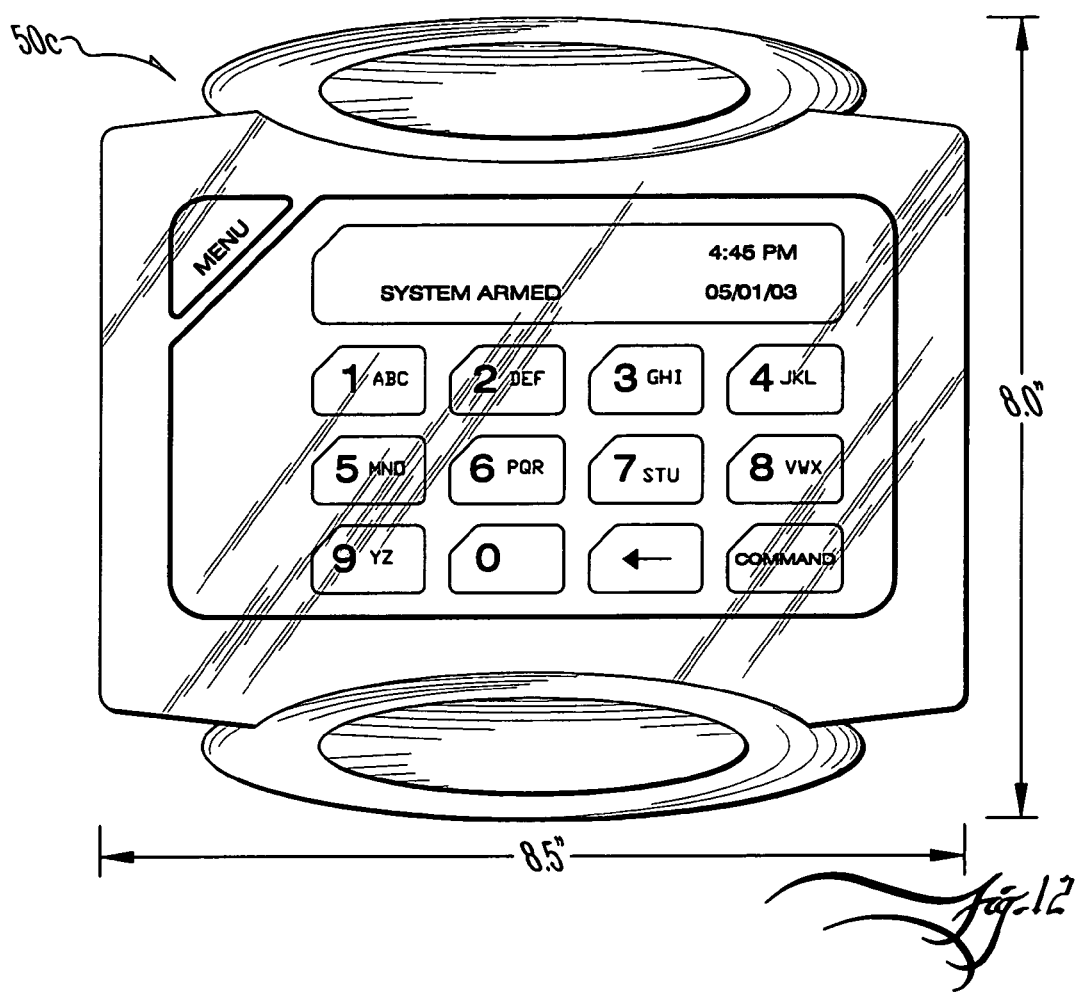

FIG. 12 is a front elevational view of FIG. 11.

FIG. 13 is a perspective view of a further embodiment of a remote camouflage keypad for alarm control panel in accordance with the invention, wherein a glass panel is bracketed between upper and lower brackets at least one of which contains operative circuitry for driving the panel as well as preferably local power storage (eg., battery(ies)) as well as communication link(s) (eg., radio transmitter(s)) for communicating with a remote control panel;

FIG. 14 is a comparable perspective view except from a relatively more acute angle;

FIG. 15 is a reduced scale side elevational view thereof; and

FIG. 16 is a front elevational view of FIG. 15.

The invention having been disclosed in connection with the foregoing variations and examples, additional variations will now be apparent to persons skilled in the art. The invention is not intended to be limited to the variations specifically mentioned.

DETAILED DESCRIPTION OF THE PREFERRED EMBODIMENTS

FIGS. 1-4 comprise a set showing a first preferred embodiment 50a for the invention, FIGS. 5-8 comprise a set showing a second preferred embodiment 50b for the invention, FIGS. 9-12 comprise a set showing a third preferred embodiment 50c for the invention, and FIGS. 13-16 comprise a set showing a fourth preferred embodiment 50d for the invention. For convenience in this written description, wherever a reference numeral is used herein (eg., "50") that has comparable counterparts on any or all other versions, on the drawing itself the reference numeral will be affixed with an alphabet-letter postfix for distinguishment purposes:—wherein postfix letter "a" will be utilized in FIGS. 1-4 for the first preferred embodiment 50a, postfix letter "b" will be utilized in FIGS. 5-8 for the second preferred embodiment 50b, postfix letter "c" will be utilized in FIGS. 9-12 for the third preferred embodiment 50c and then, naturally enough, postfix letter "d" will be utilized in FIGS. 13-16 for the fourth preferred embodiment 50d.

The drawings show a glass keypad 50 in accordance with the invention for an automatic premise-monitoring alarm system of the type having a control panel and a various remote sensors includes the following.

That is, the glass keypad 50 generally comprises preferably a planar screen 52, and preferably formed predominantly of see-through glass. However, various other see-through or show-through materials will also suffice for the purposes and are not excluded from being utilized to implement the invention. The screen 52 is defined by a peripheral edge 54 spacing inboard and outboard faces 56 and 58 wherein the planar screen 52 is adapted for mounting relative to a vertical support surface or wall W such that the inboard face 56 is generally flush thereagainst or closely gapped therefrom.

The glass keypad 50 is especially advantageous for locating remote from the control panel and is linked via wireless or physical conductor paths to the control panel for exchanging inputs and outputs.

The glass keypad 50 further comprises a package of operative circuitry and devices (not shown by the drawings) as well as a diminutive housing 60 that conceals the operative circuitry and devices and is preferably mounted to the peripheral edge 54 and/or outboard face 58 so as not to interfere with the flush or closely gapped mounting of the inboard face 56 to the wall W. The diminutive housing 60 also preferably contains a battery for onboard power supply as well as a transceiver for remote communication with the control panel (not shown).

The glass keypad 50's operative circuitry and devices include a source of illumination such that said glass keypad 50 has an display mode as well as a sleep or non-display mode. The display mode illuminates a display 64 on or in the screen 52, and this display 64 includes illuminated keys 65 that respond to a user's keystroke or apparent keystroke with an operative signal, such that one or more keystrokes allow entry of inputs to the control panel. In contrast, the sleep or non-display mode switches the illumination to a reduced power state such that the keypad display 64 is for all practical purposes invisible, and this thereby disguises the glass keypad 50's utility from unsuspecting passersby.

It is preferred if the see-through glass or whatever other suitable see- or show-through material is actually transparent. That way, if the reduced power state is off or very low, then any color or texture or design on the wall W will show through. Accordingly, the glass keypad 50 self-camouflages itself against or closely gapped from the wall W.

It is more preferential if reduced power state is a very dim soft glow such that under shining light the very dim soft glow is virtually imperceptible to unsuspecting passersby while, in contrast, in darkness the very dim soft glow assists authorized users in finding their way through the darkness to the keypad 50.

Preferably the glass keypad 50's operative circuitry and devices remain in a continually ON state (so long as there is power). It is further preferred if the glass keypad 50's operative circuitry and devices are configured to automatically switch to the sleep mode after the lapse of a given term of non-use with the display 64 as well as to respond to touch or apparent touch of the outboard face 58 while in the sleep mode by switching to the display mode.

According to one preferred version of the invention, the peripheral edge 54 comprises a spaced pair of lateral runs 66 and a spaced pair of transverse runs 68, such that the housing 60 comprises at least two distinct units 62 for mounting oppositely on one and the other of the lateral runs 66 or one and the other of the transverse runs 68. Each of the two distinct units 62 includes its own source of illumination, the double sources spaced oppositely as described therefore ensure that the display 64 has constant, uniform illumination.

However, according to an alternative preferred version of the invention, the diminutive housing 60 comprises a single discrete unit 61 that is mounted on the outboard face 58 well within, or that is well spaced away from, the peripheral edge 54. For this version 50b of the invention, the source of illumination is configured such that when illuminated its casts out light 360° from the housing in the plane of screen 52b.

Generally speaking, the screen 52 will not have a monolithic construction but instead a composite construction.

More particular reference for supply of matters of technical background for the invention will be achieved by references to commonly-invented, commonly-owned U.S. Pat. No. 5,745,849, entitled "Combination Cordless Telephone and Premise-monitoring Alarm System," U.S. Pat. No. 6,570,496 (B2), entitled "Networks And Circuits For Alarm System Operations," and U.S. Pat. No. 6,650,238 (B1), entitled "Communication Path Integrity Supervision in a Network System for Automatic Alarm Data Communication," the disclosures of all which are incorporated fully herein by reference.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An automatic premise-monitoring alarm system, comprising:
    a control panel;
    a plurality of remote sensors linked to the control panel for communicating alarm events;
    a remote glass keypad linked to and providing a user interface for exchanging inputs and outputs with the control panel;
    said glass keypad comprising a planar screen formed predominantly of see-through glass and having a peripheral edge spacing inboard and outboard faces wherein the planar screen is adapted for mounting relative to a vertical support surface or wall such that the inboard face is generally flush thereagainst or closely gapped therefrom, said glass keypad further comprising operative circuitry and devices as well as a diminutive housing that conceals the operative circuitry and devices and is mounted to the peripheral edge and/or outboard face;
    said glass keypad's operative circuitry and devices including a source of illumination such that said glass keypad has an display mode as well as a sleep mode;
    wherein the display mode illuminates a display on or in the screen which display includes illuminated keys that respond to a user's keystroke or apparent keystroke with an operative signal, such that one or more keystrokes allow entry of inputs to the control panel;
    wherein the sleep mode switches the illumination to a reduced power state such that the keypad display is invisible, thereby disguising the glass keypad's utility from unsuspecting passersby.

2. The alarm system of claim 1 wherein the see-through glass is transparent and the reduced power state is off or very low such that any color, texture or design on the vertical support surface or wall shows through, said glass keypad being self-camouflaged thereby.

3. The alarm system of claim 2 wherein the reduced power state is a soft glow such that under shining light the soft glow is virtually imperceptible to unsuspecting passersby and that in darkness the soft glow assists authorized users in finding their way through the darkness to the keypad.

4. The alarm system of claim 1 further including a source of power wherein said glass keypad's operative circuitry and devices draw from that source of power and, so long as power is available, operate in a continually ON state;
    said glass keypad's operative circuitry and devices being configured to automatically switch to the sleep mode after the lapse of a given term of non-use with the display as well as to respond to touch or apparent touch of the outboard face while in the sleep mode by switching to the display mode.

5. The alarm system of claim 1 wherein the peripheral edges comprises a spaced pair of lateral runs and a spaced pair of transverse runs, and wherein the housing comprises at least two distinct units for mounting oppositely on one and the other of the lateral runs or one and the other of the transverse runs, each of said two units including a source of illumination for ensuring the display has constant, uniform illumination.

6. The alarm system of claim 1 wherein the housing is mounted on the outboard face well within and spaced away from the peripheral edge, said source of illumination when illuminated casting out light 360° from the housing in the plane of screen.

7. The alarm system of claim 1 wherein the planar screen has a composite construction.

8. A show-through keypad for an automatic premise-monitoring alarm system of the type characterized by a control panel and a plurality of remote sensors linked to the control panel for communicating alarm events, said show-through keypad comprising:
    a screen formed predominantly of see-through material and having a peripheral edge spacing inboard and outboard faces wherein the screen is adapted for mounting relative to a vertical support surface or wall such that the inboard face is generally flush thereagainst or closely gapped therefrom;
    said show-through keypad being for locating remote from and linking to provide a user interface for exchanging inputs and outputs with the control panel, and further comprising operative circuitry and devices as well as a diminutive housing that conceals the operative circuitry and devices and is mounted to the peripheral edge and/or outboard face;
    said show-through keypad's operative circuitry and devices including a source of illumination such that said show-through keypad has an display mode as well as a sleep mode;
    wherein the display mode illuminates a display on or in the screen which display includes illuminated keys that respond to a user's keystroke or apparent keystroke with an operative signal, such that one or more keystrokes allow entry of inputs to the control panel;
    wherein the sleep mode switches the illumination to a reduced power state such that the keypad display is invisible, thereby disguising the show-through keypad's utility from unsuspecting passersby.

9. The keypad of claim 8 the see-through material is transparent and the reduced power state is off or very low such that any color, texture or design on the vertical support surface or wall shows through, said show-through keypad being self-camouflaged thereby.

10. The keypad of claim 9 wherein the reduced power state is a soft glow such that under shining light the soft glow is virtually imperceptible to unsuspecting passersby and that in darkness the soft glow assists authorized users in finding their way through the darkness to the keypad.

11. The keypad of claim 8 further including a source of power wherein said show-through keypad's operative circuitry and devices draw from that source of power and, so long as power is available, operate in a continually ON state;

said show-through keypad's operative circuitry and devices being configured to automatically switch to the sleep mode after the lapse of a given term of non-use with the display as well as to respond to touch or apparent touch of the outboard face while in the sleep mode by switching to the display mode.

12. The keypad of claim 8 wherein the peripheral edges comprises a spaced pair of first runs and a spaced pair of second runs, and wherein the housing comprises at least two distinct units for mounting oppositely on one and the other of the first runs or one and the other of the second runs, each of said two units including a source of illumination for ensuring the display has constant, uniform illumination.

13. The keypad of claim 8 wherein the housing is mounted on the outboard face well within and spaced away from the peripheral edge, said source of illumination when illuminated casting out light 360° from the housing in the plane of screen.

14. The keypad of claim 8 wherein the screen has a composite construction.

15. A show-through keypad for an automatic premise-monitoring alarm system of the type characterized by a control panel and a plurality of remote sensors linked to the control panel for communicating alarm events, said show-through keypad comprising:

a screen formed predominantly of see-through material and having a peripheral edge spacing inboard and outboard faces wherein the screen is adapted for mounting relative to a vertical support surface or wall such that the inboard face is generally flush thereagainst or closely gapped therefrom;

said show-through keypad being for locating remote from and linking to control panel in order to provide a user interface for exchanging inputs and outputs, and further comprising operative circuitry and devices as well as a diminutive housing that conceals the operative circuitry and devices and is mounted to not obstruct or impede the screen's mounting to the vertical support surface or wall;

said show-through keypad's operative circuitry and devices including a source of illumination such that said show-through keypad has an display mode as well as a non-display mode;

wherein the display mode illuminates a display on or in the screen which display includes illuminated keys that respond to a user's keystroke or apparent keystroke with an operative signal, such that one or more keystrokes allow entry of inputs to the control panel;

wherein the non-display mode switches the illumination to a reduced power state such that the keypad display is practicably imperceptible, thereby disguising the show-through keypad's utility from unsuspecting passersby.

16. The keypad of claim 15 wherein the see-through material is transparent and the reduced power state is off or very low such that any color, texture or design on the vertical support surface or wall shows through, said show-through keypad being self-camouflaged thereby.

17. The keypad of claim 16 wherein the reduced power state is a very dim soft glow such that under shining light the very dim soft glow is virtually imperceptible to unsuspecting passersby and that in darkness the very dim soft glow assists authorized users in finding their way through the darkness to the keypad.

18. The keypad of claim 15 further including a source of power wherein said show-through keypad's operative circuitry and devices draw from that source of power and, so long as power is available, operate in a continually ON state;

said show-through keypad's operative circuitry and devices being configured to automatically switch to the non-display mode after the lapse of a given term of non-use with the display as well as to respond to touch or apparent touch of the outboard face while in the non-display mode by switching to the display mode.

19. The keypad of claim 15 wherein the peripheral edges comprises a spaced pair of first runs and a spaced pair of second runs, and wherein the housing comprises at least two distinct units for mounting oppositely on one and the other of the first runs or one and the other of the second runs, each of said two units including a source of illumination for ensuring the display has constant, uniform illumination.

20. The keypad of claim 15 wherein the housing is mounted on the outboard face well within and spaced away from the peripheral edge, said source of illumination when illuminated casting out light 360° from the housing in the plane of screen.

* * * * *